United States Patent

[11] 3,630,677

| [72] | Inventor | John C. Angus |
| | | Cleveland Heights, Ohio |
| [21] | Appl. No. | 740,226 |
| [22] | Filed | June 26, 1968 |
| [45] | Patented | Dec. 28, 1971 |
| [73] | Assignee | Case Western Reserve University |

[54] MANUFACTURE OF SYNTHETIC DIAMONDS
9 Claims, 4 Drawing Figs.

[52] U.S. Cl. .................................................. 23/209.1,
23/301, 252/502, 252/503
[51] Int. Cl. ............................................................ C01b 31/06
[50] Field of Search ........................................... 23/209.1 D;
252/302, 503, 506, 508, 62.3 E; 148/1.5, 174, 189, 171

[56] References Cited
UNITED STATES PATENTS

| 3,030,188 | 4/1962 | Eversole ...................... | 23/209.1 |
| 3,134,739 | 5/1964 | Cannon ........................ | 252/503 |
| 3,142,595 | 7/1964 | Wentorf ....................... | 148/171 |
| 3,148,161 | 9/1964 | Wentorf ....................... | 252/502 |
| 3,268,457 | 8/1966 | Giardini et al. ............... | 23/209.1 X |
| 3,348,984 | 10/1967 | Pammer ........................ | 148/174 |
| 3,473,974 | 10/1969 | Faust et al. .................... | 148/174 |

*Primary Examiner*—Edward J. Meros
*Attorney*—McNenny, Farrington, Pearne and Gordon ABSTRACT: There is provided an improvement on a low-pressure process for the growth of synthetic diamonds from diamond seed crystals by contacting them with a monocarbon atom gas which also contains a "doping agent" such as a compound of boron or aluminum or lithium vapor in the gas phase at a pressure of from 760 (Torr.) to $1 \times 10^{-1}$ (Torr.) and at a temperature in the range of from 900° C. to 1450° C. and for deposition-cleaning cycle periods in the range of from 4 to 28 hours.

INVENTOR
JOHN C. ANGUS

INVENTOR
JOHN C. ANGUS 3,630,677

MANUFACTURE OF SYNTHETIC DIAMONDS

This invention may be used by or on behalf of the United States Government without the payment of any royalties therefor.

The invention relates as indicated to a modified low-pressure process for the growth of diamonds from diamond seed crystals which is characterized by using a mixture of a boron or aluminum compound or lithium vapor with a monocarbon atom source of carbon for diamond deposition. Inclusion of such material (hereinafter called a "doping agent") in the diamond deposition gas results in the production of diamond crystals including boron, aluminum or lithium in the crystal lattice. These elements impart color to the diamond rendering them useful in the gemstone field and also impart semiconducting properties to the diamond crystals. The resulting synthetically grown diamonds may also be used in the manufacture of industrial abrasive tools. The manner of using such materials as are produced by the process herein described is within the skill of artisans in the gemstone, electronics, and abrasive tool fields.

The term "low pressure" insofar as it is applied to the production of diamond contemplates anything below 40,000 p.s.i. One "low pressure" process (Hibshman U.S. Pat. No. 3,371,996) contemplates pressures of from 1 to 2,000 atmospheres, and temperatures which are limited to 1,100° C. or less. This process is characterized by utilization of a platinum catalyst to promote the production of carbon from carbon monoxide. The present improvements contemplate very much lower pressures, preferably a hydrocarbon source for the carbon and an absence of metallic catalysts. Another process (Eversole U.S. Pat. Nos. 3,030,187 and 3,030,188) contemplates temperatures in the range of from 600° to 1600° and pressures of from 0.03 mm. Hg to 10 atmospheres.

A special type of low-pressure carbon transport process is taught by Brinkman U.S Pat No. 3,142,539 which contemplates temperatures in the range of from 1000° to 1800° C., and a molten metallic medium for transporting carbon to the seed crystals. Brinkman in U.S. Pat. No. 3,175,885 discloses another carbon transport process utilizing a vapor transport for carbon evaporated from pure graphite at very high temperatures, distinguished by maintaining the seeds and carbon source at different temperatures.

As an example of an extremely high-pressure process, reference may be had to U.S. Pat. No. 3,334,968 to Ishizuka who contemplates pressures of 75,000 atmospheres. Also reference may be had to the patent to Wentorf U.S. Pat. No. 3,297,407 which utilizes seed crystals but extremely high pressures on the order of 75,000 atmospheres.

There are quite a few other patents which contemplate high-pressure equilibrium processes and these are exemplified by the patents to Darrow U.S. Pat. No. 3,310,501; Strong U.S. Pat. No. 3,303,053; Wentorf U.S. Pat. No. 3,142,595; Wentorf U.S. Pat. No. 3,148,161; Wentorf U.S. Pat. No. 3,181,933; Giardini U.S. Pat. No. 3,268,457.

As indicated, the present invention is distinguished from the prior art in that the gas containing the material from which carbon is derived for deposition on the diamond seed crystals also contains a doping agent. The amount of doping agent used relative to the monocarbon atom compound source of carbon is in the range of from 0.0005 percent to 1 percent by volume. Otherwise, the conditions employed are those as taught by Eversole in U.S. Pat. Nos. 3,030,187 and 3,030,188.

Equipment which may be used in carrying out the process of this invention is shown in diagrammatic and schematic form in the annexed drawings.

Briefly stated, therefore, this invention contemplates in a process for growing diamonds from diamond seed crystals by contacting such seed crystals with a gas including a compound of carbon having a single atom of carbon per molecule at a temperature in the range of from 900° to 1450° C. and a pressure of from $1\times10^{-1}$ (Torr.) to 760 (Torr.), the improvement which comprises incorporation in said gas prior to contact with said seed crystals from 0.0005 to 1.0 percent by volume of a gaseous compound of boron, or a gaseous compound of aluminum, or lithium metal vapor.

Figure 1:
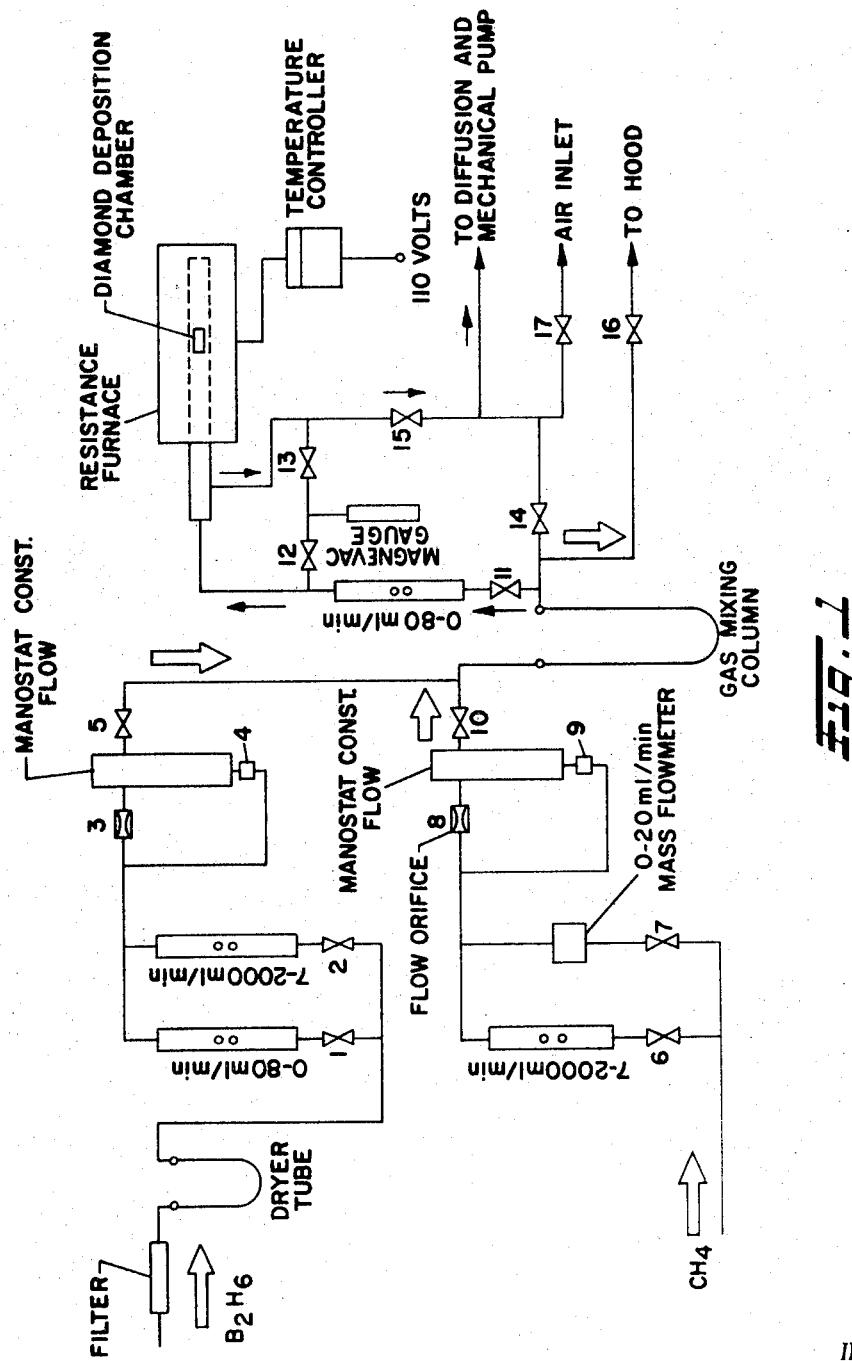
FIG. 1 shows apparatus diagrammatically and schematically in which the growth of diamond crystals from seed crystals may be performed.
Figure 2:
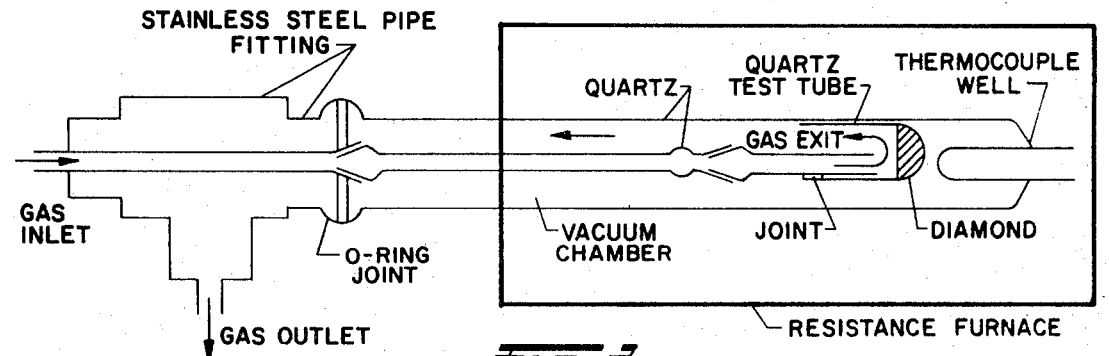
FIG. 2 is a diagrammatic illustration of a quartz vacuum chamber in which the diamond growth occurs.

Referring now more particularly to FIGS. 1 and 2, equipment useful for diamond growth in accordance with this process includes gas supplies for methane, for example, and the doping agent, flow and pressure controls, and a furnace. The doping can be purified with a suitable reactor or a diffuser and drier tube. Doping agent flow is controlled by a Cartesian diver manostat or a capacitance manometer flow regulator and a needle valve 5. Thus, for a particular setting of needle valve 5, the flow will be a constant independent of upstream or downstream pressure fluctuations. The flow system for the methane is the same as that for the doping agent except that a deoxygenating catalytic reactor and drier tube were not used. Methane of the highest available purity is used, e.g. 99.99 percent $CH_4$, dew point approximately $-100°$ F., 3 p.p.m. $O_2$ and 15 p.p.m. $N_2$. The flow system is a vacuum tight to prevent any air from entering. A mass flowmeter replaced the low range flowmeter in the doping agent line. The mass flowmeter was used for more accurate measure of the very low methane flow rates.

Through mixing of the carbon source gas, e.g. high purity methane, and the doping gas is done in a column filled with glass beads. Since a high flow of gas may be required to obtain various ratios of carbon source gas and boron compound, e.g. diborane, or aluminum compound, e.g. aluminum trichloride, a large portion of the gas is vented by means of valve 16 into a fume hood where it is burned off. A small portion of the gas is metered into the quartz diamond deposition chamber through valve 11 which reduces the pressure from approximately 3 p.s.i.g. to the operating pressure of the pressure system. After passing over the seed crystals in the diamond deposition chamber, the gas is exhausted through a diffusion pump. The operating pressure in the system is controlled by adjusting the downstream needle valve 15. Pressure in the diamond deposition chamber is measured by electronic means.

The diamond deposition chamber is best illustrated in FIG. 2, and shows its disposition in the resistance furnace and the fact that the component parts within the furnace are formed from quartz. The temperature is measured by means of a thermocouple inserted in a thermocouple well in close proximity to the sample chamber.

As shown in FIG. 2, diamond seed crystal powder is placed in the bottom of the quartz test tube so that the gas flows along a path through a quartz joint, over the diamond seed crystals, and out the top of the test tube. The test tube and the quartz gas inlet tube are joined together near the lip of the test tube to make it easier to slide the assembly into the vacuum chamber. It is preferred that the gas not flow through the diamond powder because it has been found that this causes too large a pressure drop across the seed crystal bed. Such a pressure drop may cause diamond powder to be blown out the sample chamber.

The temperature of the diamond seed crystal is maintained at a constant level by a 24-inch long electrical resistance furnace. The temperature profile along the length of the furnace is adjustable by means of electrical shunt taps on the back of the furnace, not shown. By adjusting the shunts across these taps, the temperature profile was made flat to within 5 inches of the ends of the resistance furnace. This flat temperature profile allows the temperature of the gas to approach equilibrium before it reaches the diamond seed crystal. A proportional band power controller is conveniently utilized to maintain the temperature within plus or minus 0.20° C. of the set point.

Figure 3:
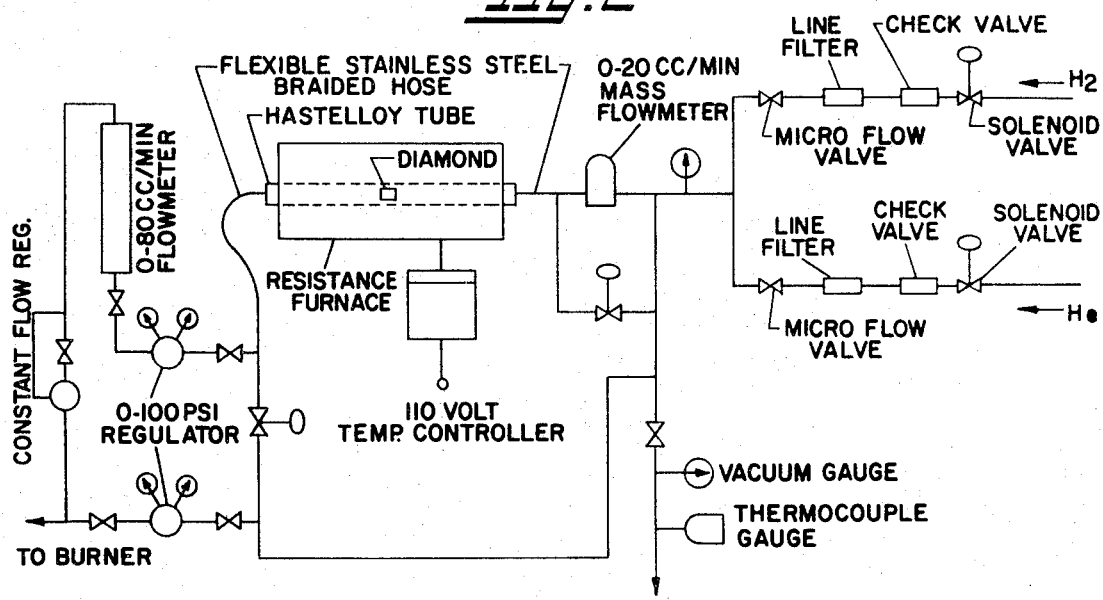
FIG. 3 shows equipment in diagrammatic and schematic form in which the cleaning of the seed crystals with hydrogen may be carried out.

Referring now to FIG. 3, there is here shown a flow diagram for an apparatus for cleaning diamond seed crystals with hydrogen under pressure, e.g. 50 atmospheres. This is but one of several methods of cleaning graphite which may be used in conjunction with the process hereof. Graphite is selectively removed from the diamond seed crystals by reaction with hydrogen at pressures on the order of 50 atmospheres, and temperatures on the order of 1000° C. The cleaning reaction is just the reverse of the methane reaction used for depositing diamond. It has been found that the rate of reaction of diamond with hydrogen at these pressures and temperatures is about 3 orders of magnitude less than the rate of reaction for hydrogen with graphite under the same conditions. Thus, graphite may be removed form diamond with very little loss of diamond. The reaction time for cleaning a supply of diamond seed crystals is about 7 hours. Under these conditions, it has been found that 99.9 percent of the graphite is removed while the weight of the diamond mass will decrease by less than 0.3 percent.

In carrying out the cleaning operation, hydrogen is contacted with the diamond seed crystals contained within a "Hastelloy" tube 36 inches long, 2 inches in diameter and having an 11/16 inch hole bored through the center. Hose connections are made to each end of the tube, and various flow control regulators and pressure gauges included in the line as shown in the diagram.

Figure 4:
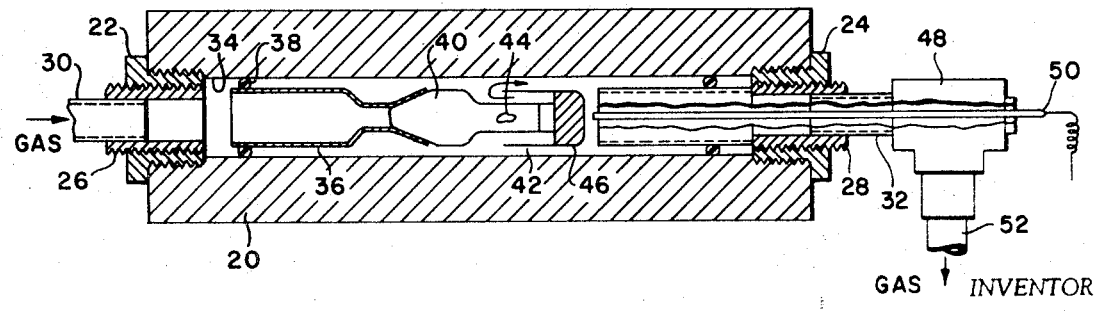
FIG. 4 illustrates the detail of the furnace for cleaning diamonds with hydrogen.

FIG. 4 shows in greater detail the furnace for cleaning diamonds with hydrogen under pressure.

Referring to FIG. 4, there is provided a bored steel tube 20 fitted with end bushing 22 and 24, and having threaded nipples 26 and 28 extending therefrom. Nipples 26 and 28 are attached to receive entering gas tube 30 and outlet gas tube 32. Thus, the bore 34 is closed except for the gas inlet and gas exit means. Disposed withing the bore 34 is an adapter 36 frictionally retained within the bore 34 by means of high temperature resistant O-ring 38, and adapted to receive the diamond sample assembly composed of a glass joint member 40 and test tube 42 secured together by sealing the tube 40 to the test tube 42 at point 44. The diamond sample 46 is disposed in the bottom of the tube. Gas entering through inlet tube 30 passes through adapter tube 36 and joint 40 flows across the diamond sample 46 and exits around the lip of the tube 42, and then passes out through the outlet gas line 32. An adapter 48 is provided to allow removal of the gas and also to provide for the introduction of a thermocouple 50 to measure the temperature of the system.

The most essential part of the cleaning apparatus is the reaction tube which must withstand pressures of at least 100 atmospheres of hydrogen at temperatures up to about 1100° C.

In general, a useful procedure for cleaning the diamond powder is as follows: The diamond sample is placed in the sample chamber or tube 42, and the sample tube 40, 42 assembled with the adapter 36 and inserted in the reaction tube 20. A stainless steel tube is connected to the inlet tube 30 and a stainless steel hose connected to the exit 52. The apparatus is evacuated to less than 10 microns through the vacuum line indicated in FIG. 3. The apparatus is then pressurized with 50 atmospheres of hydrogen and the temperature in the reaction tube 20 elevated to 1032° C. where it is maintained for a period of 7 hours. The furnace is then colled and the hydrogen vented. A vacuum is again pulled on the system and the system filled with helium to atmospheric pressure. The diamond sample is then removed from the tube.

The diamond seed crystal samples which are used in this invention are in the form of natural diamond powder having a particle size of 0 to 1 micron or from 1 to 5 microns. Industrial diamond such as this material is contains metallic impurities along with a small amount of graphite. Most of the metallic impurities can be removed by pretreatment of the diamond powder with aqua regia. Certain impurities such as tungsten oxides can be removed only with hydrofluoric acid.

A typical procedure for initial or precleaning of the diamond powder is to add aqua regia to the diamond powder at room temperature and maintain the diamond powder submerged therein for a period of 24 hours after which time the sample is rinsed. The diamond powder is then treated with concentrated hydrofluoric acid in a polyethylene container for an additional 24-hour period at room temperature. The acid is decanted and the powder is then transferred to a glass test tube and dried by heating to a temperature not in excess 100° C. At this point, the diamond powder can be submitted to the high-pressure hydrogen-cleaning process.

The following examples are for illustrative purposes only and are not to be construed as limiting the invention.

EXAMPLE 1

Methane gas containing 0.83 percent diborane ($b_2H_6$) by volume is passed over 0.3306 grams of 0 to 1 micron particle size diamond powder for 22 hours at 1052° C. The methane pressure is 0.17 (Torr.). After deposition the quartz sample chamber appears clean, i.e. with little graphite deposited on it, and the diamond powder appears quite dark. The sample after deposition is 0.3558 grams.

The dark graphitic deposit is removed from the diamond by reacting with hydrogen at 51 atmospheres and 1027° C. for 7 hours and 15 minutes. This procedure removes 99.9 percent of the graphitic carbon. The final diamond weight is 0.3404 grams. A chemical analysis of the entire sample shows 0.01 percent boron present.

EXAMPLE 2

A portion (0.1856 grams) of the diamond from example 1 is subjected to four more deposition and cleaning cycles as outlined in the following table:

| | Time (hours) | Temperature (° C.) | Pressure (torr) | Mass increase (grams) |
|---|---|---|---|---|
| Run: | | | | |
| 1 | 22.5 | 1,053 | .13 | .0003 |
| 2 | 16.0 | 1,053 | .23 | .0039 |
| 3 | 27.0 | 1,053 | .35 | .0042 |
| 4 | 20.3 | 1,053 | .36 | .0049 |

The cumulative mass increase from the original starting material is 13.6 percent. In each run the gas from which deposition took place is methane, $CH_4$, with 0.83 percent diborane, $B_2H_6$, added. The cleaning procedure after each cycle is done with hydrogen at 51 atmospheres and 1035° C. for 7 hours.

After the depositions the samples are slightly darker than what normally is observed when no diborane is present in the gas. The electron spin resonance spectra of the diamond grown in the presence of diborane show significant differences than the spectra obtained with diamond grown with no diborane present. Debye Scherrer X-ray patterns do not show the presence of the unwanted boron carbide phase $B_4C$.

EXAMPLE 3

Methane gas at 1200° C. and $10^{-3}$ (Torr.) containing 0.1 percent of boron trichloride is passed over diamond seed crystals for 48 hours. The crystals are cleaned for 7 hours with hydrogen at 50 atmospheres and 1030° C. Similar results to those reported in examples 1 and 2 are found.

EXAMPLE 4

Methane gas at 1000 (Torr.) is passed through a bed of solid $AlCl_3$ maintained at 100° C. at which temperature the vapor pressure of $AlCl_3$ is approximately 1 (Torr.). The effluent gas which contains 0.1 percent $AlCl_3$ is reduced in pressure to 0.2 (Torr.) and passed over diamond seed crystals at 1050° C. for 12 hours. The crystals are cleaned as described in example 1 and similar results are obtained.

EXAMPLE 5

Methane gas at 1050° C. and 0.2 (Torr.) is passed over diamond seed crystals for 12 hours. A small iron crucible containing Li metal is in close proximity (1 cm.) to the diamond seed crystals so the Li vapor will contact the diamond crystals during the growth process. Cleaning of the crystals is done as described in example 1. Similar results are obtained.

Instead of diborane ($B_2H_6$), other boron-containing compounds may be used, for example the boranes including $B_4H_{10}$, $B_5H_9$, $B_6H_{10}$, $B_{10}H_{14}$, etc. Also, the halogenated boranes such as $B_2H_5Br$, $B_2H_5Cl$, $B_2H_5I$, as well as the completely halogenated compounds such as $BCl_3$, $BBr_3$, $BBr_2I$, $BBrI_2$ and $BI_3$ may be used.

Alternate sources of aluminum may be used. These include among others triethyl aluminum, trimethyl aluminum, aluminum tribromide, and aluminum triiodide. Also, an electrical heated aluminum wire may be used. The wire is heated for 2.0 to 200 millisecond intervals by means of a capacitance discharge.

It has been found that in many cases even trace amounts of impurities in the gas will poison the growth process, and it is, therefore quite surprising that diamond is grown in the presence of a doping agent such as the boron compounds, aluminum compounds and lithium metal or lithium compounds. Such materials not only do not poison the system, but cooperate with it to produce particularly useful products.

What is claimed is:
1. In a process for growing diamonds from diamond seed crystals by contacting such seed crystals with a gas including a compound of carbon at a temperature in the range of from 900° to 1450° C. and a pressure of from $1\times10^{-1}$ (Torr.) to 760 (Torr.), the improvement which comprises incorporating in said gas prior to contact with said seed crystals from 0.0005 percent to 1.0 percent by volume of a gaseous doping agent selected from gaseous compounds of aluminum, and lithium metal vapor.
2. A process in accordance with claim 1 in which the gaseous doping is a borane.
3. A process in accordance with claim 2 in which the borane is a halogenated borane.
4. A process in accordance with claim 2 in which the borane is diborane.
5. A process in accordance with claim 1 in which the gaseous doping agent is an aluminum halide.
6. A process in accordance with claim 5 in which the aluminum halide is aluminum chloride.
7. A process in accordance with claim 1 in which the gaseous doping agent is an aluminum alkyl.
8. A process in accordance with claim 7 in which the aluminum alkyl is aluminum triethyl.
9. A process in accordance with claim 1 in which the doping agent is lithium.

* * * * *

UNITED STATES PATENT OFFICE
CERTIFICATE OF CORRECTION

Patent No. 3,630,677   Dated December 28, 1971

Inventor(s) John C. Angus

It is certified that error appears in the above-identified patent and that said Letters Patent are hereby corrected as shown below:

Column 2, Line 74, "0.20°C." should read -- 0.2°C. --

Column 4, Line 8, after "powder" insert -- thoroughly rinsed with distilled water. The powder --.

Column 4, Line 22, after "sample" insert -- weight --.

Column 6, Line 9, after "of" insert -- boron, gaseous compounds of --.

Column 6, Line 12, after "doping" insert -- agent --.

Signed and sealed this 13th day of June 1972.

(SEAL)
Attest:

EDWARD M. FLETCHER, JR.
Attesting Officer

ROBERT GOTTSCHALK
Commissioner of Patents